United States Patent
Li et al.

(10) Patent No.: US 11,306,892 B2
(45) Date of Patent: Apr. 19, 2022

(54) VEHICLE LAMP III-ZONE ILLUMINATION STRUCTURE, VEHICLE LAMP CONDENSER, AUTOMOBILE ILLUMINATION MODULE AND AUTOMOBILE

(71) Applicant: HASCO VISION TECHNOLOGY CO., LTD., Shanghai (CN)

(72) Inventors: Hui Li, Shanghai (CN); He Zhu, Shanghai (CN); Zhiping Qiu, Shanghai (CN); Weigang Gong, Shanghai (CN); Rui Nie, Shanghai (CN)

(73) Assignee: HASCO VISION TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/292,884

(22) PCT Filed: Oct. 11, 2019

(86) PCT No.: PCT/CN2019/110503
§ 371 (c)(1),
(2) Date: May 11, 2021

(87) PCT Pub. No.: WO2020/232953
PCT Pub. Date: Nov. 26, 2020

(65) Prior Publication Data
US 2021/0404622 A1     Dec. 30, 2021

(30) Foreign Application Priority Data

May 21, 2019  (CN) .......................... 201910424570.6

(51) Int. Cl.
*F21S 41/20* (2018.01)
*F21S 41/30* (2018.01)
(Continued)

(52) U.S. Cl.
CPC .......... *F21S 41/285* (2018.01); *B60Q 1/1415* (2013.01); *F21S 41/30* (2018.01); *F21S 41/322* (2018.01); *F21W 2102/135* (2018.01)

(58) Field of Classification Search
CPC .......... F21S 41/285; F21S 41/27; F21S 41/30; F21S 41/322
See application file for complete search history.

(56) References Cited

U.S. PATENT DOCUMENTS 10,451,239 B2 *  10/2019  Suwa ..................... F21S 41/663
10,690,309 B2 *   6/2020  Gromfeld ............... F21S 41/24
2021/0325017 A1 * 10/2021  Iwasaki ................. F21S 41/322

FOREIGN PATENT DOCUMENTS

| CN | 106122870 A | 11/2016 |
| CN | 205991417 A | 3/2017 |

(Continued)

OTHER PUBLICATIONS

2010—GB 25991-2010—"Automotive headlamps with LED light sources and/or LED modules".

*Primary Examiner* — Matthew J. Peerce
(74) *Attorney, Agent, or Firm* — Volpe Koenig

(57) ABSTRACT

Provided are a vehicle lamp III-zone illumination structure, vehicle lamp condenser, automobile illumination module, and automobile. The illumination structure comprises a III-zone light-incident part and a III-zone light-emitting part, sequentially arranged along the direction of incidence of light beams; The light-incident part comprises two light-transmitting tabs distributed in the horizontal direction; each tab comprises a III-zone light-incident surface, and the structure of the tabs is suitable for forming a light expansion profile, the normal direction of the light-incident surface faces the light-emitting part; the III-zone forming light beams are incident on the light-incident surface, and after being diffused by the light-incident surface, illuminate (Continued)

toward the light-emitting part, and are emitted via the light-emitting part. Also provided are a vehicle lamp condenser of the illumination structure, an automobile illumination module comprising the vehicle lamp condenser, an automobile illumination apparatus comprising the automobile illumination module, and an automobile comprising the automobile illumination apparatus.

19 Claims, 9 Drawing Sheets

(51) Int. Cl.
*B60Q 1/14* (2006.01)
*F21S 41/32* (2018.01)
*F21W 102/135* (2018.01)

(56) References Cited

FOREIGN PATENT DOCUMENTS

| | | | |
|---|---|---|---|
| CN | 206072936 A | 4/2017 | |
| CN | 107131462 A | 9/2017 | |
| CN | 109027948 A | 12/2018 | |
| JP | 2016141250 A | 8/2016 | |

* cited by examiner

VEHICLE LAMP III-ZONE ILLUMINATION STRUCTURE, VEHICLE LAMP CONDENSER, AUTOMOBILE ILLUMINATION MODULE AND AUTOMOBILE

CROSS-REFERENCE TO RELATED APPLICATION

This application is a 35 USC § 371 national stage of international application No. PCT/CN2019/110503, which is entitled "VEHICLE LAMP III-ZONE ILLUMINATION STRUCTURE, VEHICLE LAMP CONDENSER, AUTOMOBILE ILLUMINATION MODULE AND AUTOMOBILE," was filed Oct. 11, 2019, and claims priority to Chinese Application No. 201910424570.6, filed on May 21, 2019, both of which are incorporated herein by reference as if fully set forth.

FIELD

The present disclosure relates to the technical field of automobile headlamp illumination, in particular to an vehicle lamp III-zone illumination structure, an vehicle lamp condenser, an automobile illumination module and an automobile.

BACKGROUND

With application of a condenser in technical fields of low beam or high beam of an automobile headlamp, an III-zone, functioning as a vital component of a low beam shape, is also a significant part of light distribution of a headlamp according to legal requirements, and a technical solution of III-zone illumination in an vehicle lamp comprising a condenser also gets innovated and developed to a certain degree accordingly.

The closest prior art of the present disclosure can refer to a Chinese invention patent CN106122870B. The patent discloses a technical solution of an vehicle lamp III-zone illumination structure, wherein an illumination apparatus for an III-zone is arranged on a condenser upper surface, and is of a ladder-like structure with a certain height, a light incident face is higher than the condenser upper surface, a longitudinal cross section of the structure of the III-zone is triangular gradually transitioning to a light emitting face from the back to the front along a light emitting direction, light enters via the light incident face of the III-zone, and after being adjusted via the light incident face, light is emitted via the light emitting face, thereby forming a light shape corresponding to an vehicle lamp III-zone. The technical solution needs to be further improved due to following technical problems: (1) the III-zone illumination structure has great influence on a high beam path, and as the condenser upper surface is set as a full reflecting face of high beam, arranging the III-zone structure on the upper surface integrally damages the condenser upper surface which originally functions as the full reflecting face of high beam, thereby causing certain influence on performance of high beam; and (2) adjustment of an III-zone light shape is not fine enough, as the light incident face of the III-zone of the technical solution is an arc with a large volume, which can integrally adjust entire light intensity of the III-zone light shape, without capability of well adjusting a local part of the III-zone light shape. In the technical solution, the structure for adjusting the local part of the III-zone light shape is a porous structure arranged at a local part of the light incident face, thus having a limited capability of adjusting the light shape.

In the technical field, a new technical solution needs to be provided urgently for solving the above technical problems.

SUMMARY

In order to overcome existing defects of the prior art, an essential technical problem to be firstly solved in the present disclosure is to provide an vehicle lamp III-zone illumination structure, which has the advantages of fine adjustment of an III-zone light shape and slight influence on a high beam shape.

The present disclosure further provides an vehicle lamp condenser comprising the vehicle lamp III-zone illumination structure, an automobile illumination module comprising the vehicle lamp condenser, an automobile illumination apparatus comprising the automobile illumination module and an automobile comprising the automobile illumination apparatus.

In order to realize the above purpose, a first aspect of the present disclosure provides an vehicle lamp III-zone illumination structure comprising an III-zone light incident portion and an III-zone light emitting portion which are sequentially arranged along a light incidence direction, wherein the III-zone light incident portion comprises at least two light transmission pieces distributed in a horizontal direction, each of the light transmission pieces comprises an III-zone light incident surface, the structure of the light transmission piece is suitable for forming light extension profile, and a normal direction of the III-zone light incident surface is toward the III-zone light emitting portion; light forming an III-zone is incident to the III-zone light incident surfaces, and after being diffused via the III-zone light incident surfaces, light is emitted to the III-zone light emitting portion and finally emitted via the III-zone light emitting portion.

Preferably, the light transmission piece is of concave curved surface structure or convex curved surface structure, and the light extension profile comprises an III-zone horizontal extension profile which is formed by cross-sectional profile of the light transmission piece in a horizontal direction and/or an III-zone vertical extension profile which is formed by cross-sectional profile of the light transmission piece in a vertical direction.

Preferably, the III-zone horizontal extension profile and/or the III-zone vertical extension profile is a arc having radius R being smaller than or equal to 5 mm.

Preferably, a plurality of light transmission pieces are sequentially arranged continuously or at intervals.

Preferably, size of the III-zone light incident surface in the horizontal direction and/or the vertical direction is 0.5-2 mm.

Preferably, the III-zone light emitting portion is of a concave cambered surface structure with a continuous curvature.

A second aspect of the present disclosure provides an vehicle lamp condenser, comprising a high beam incident portion, an oblique reflecting surface, a condenser upper surface and a front-back optical channel, and further comprising the above vehicle lamp III-zone illumination structure.

Preferably, one end of the oblique reflecting surface is connected to the high beam incident portion and the other end of the oblique reflecting surface is connected to the condenser upper surface; the III-zone light incident portion is arranged at one side, in proximity to the condenser upper surface, of an upper surface of the oblique reflecting surface, and the III-zone light emitting portion is arranged at an end part, away from the oblique reflecting surface, of one end of the condenser upper surface; and the front-back optical channel is arranged between the III-zone light emitting portion and the oblique reflecting surface.

Preferably, the high beam incident portion comprises at least one condensing cup-like structure, a concave cavity at a center of the condensing cup-like structure, and a cross section of an outer profile of the condensing cup-like structure gradually increases along a light emitting direction; and a normal direction of a light incident surface of the high beam incident portion is a vertical direction.

Preferably, the vehicle lamp condenser further comprises a 50 L dark area forming structure which is formed in middle of a front end of the condenser upper surface and/or a cut-off line forming structure which is formed at an intersection of the condenser upper surface and the III-zone light emitting portion.

Preferably, the high beam incident portion, the oblique reflecting surface, the condenser upper surface and the front-back optical channel are formed integrally, and the vehicle lamp condenser is molded by transparent plastic, silicone or glass.

A third aspect of the present disclosure provides an automobile illumination module, comprising a high beam circuit board, a reflecting mirror, a low beam circuit board, a lens and the above vehicle lamp condenser.

A fourth aspect of the present disclosure provides an automobile illumination apparatus, comprising the above automobile illumination module.

A fifth aspect of the present disclosure provides an automobile, comprising the above automobile illumination apparatus.

Through the above technical solution, the present disclosure has the beneficial effects as follows:

1. The III-zone light shape can be adjusted finely by the vehicle lamp III-zone illumination structure, as the light incident surface of the vehicle lamp III-zone illumination structure in the present disclosure is set as a plurality of light transmission pieces for light extension in the horizontal direction and/or the vertical direction. Light shapes corresponding to the plurality of light transmission pieces with small areas are jointly spliced and overlapped to form the III-zone light shape, so that the III-zone light shape can be split more finely and can be adjusted more finely; and 2. in application of the vehicle lamp III-zone illumination structure to the vehicle lamp condenser, the III-zone light incident portion is arranged on the oblique reflecting surface and is close to a joint of the oblique reflecting surface and the condenser upper surface. Due to such arrangement, light of the III-zone and light of high beam share one optical channel, without damaging the condenser upper surface playing a role in full reflection of high beam, resulting in slight influence on a high beam shape.

Other features and advantages of the present disclosure will be described in details in subsequent specific embodiments.

Figure 1:
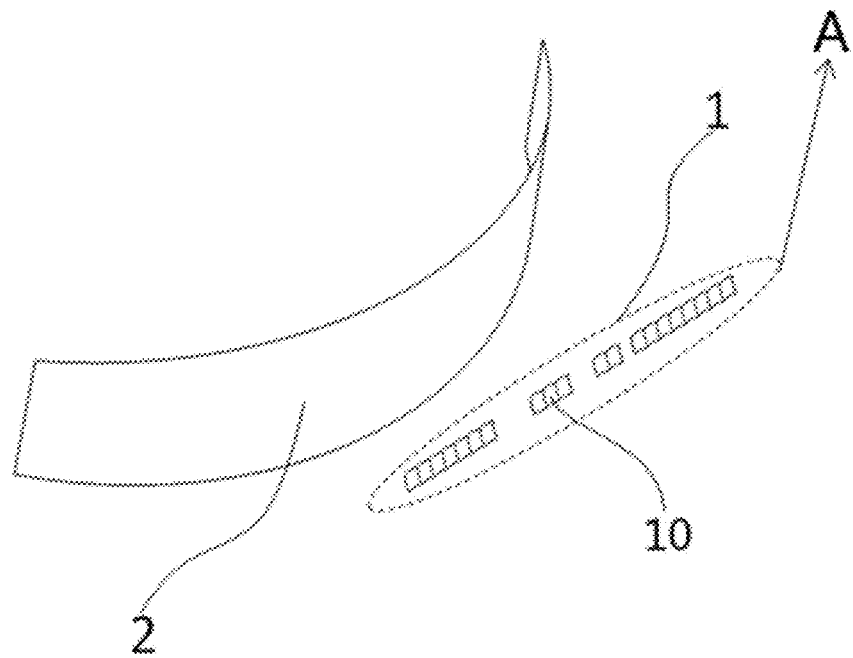
FIG. 1 is a perspective view of an embodiment of an vehicle lamp III-zone illumination structure in the present disclosure.
Figure 2:
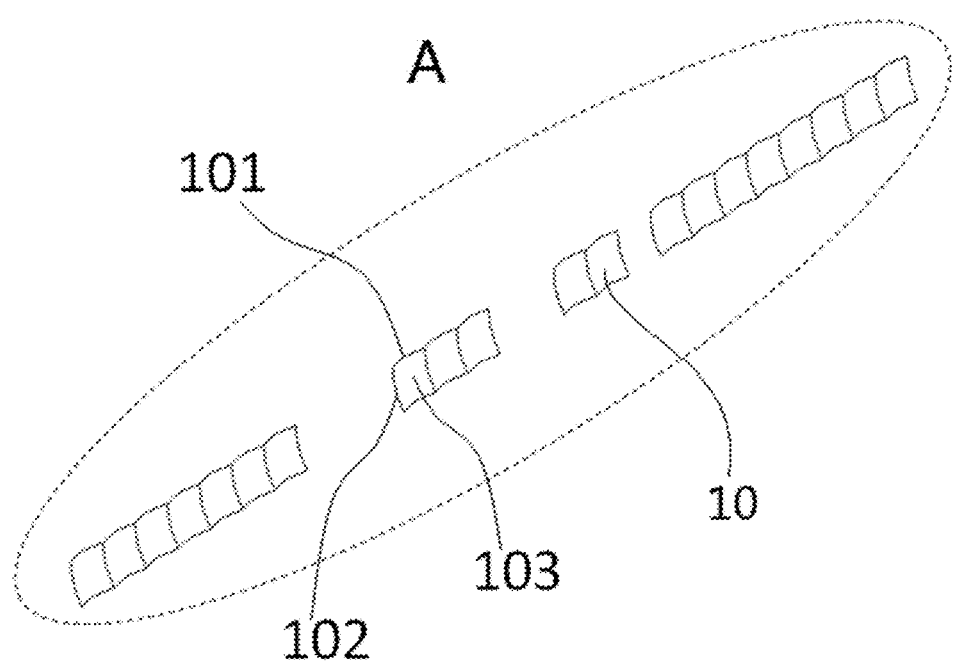
FIG. 2 is a partial enlargement view of a part A in FIG. 1.
Figure 3:
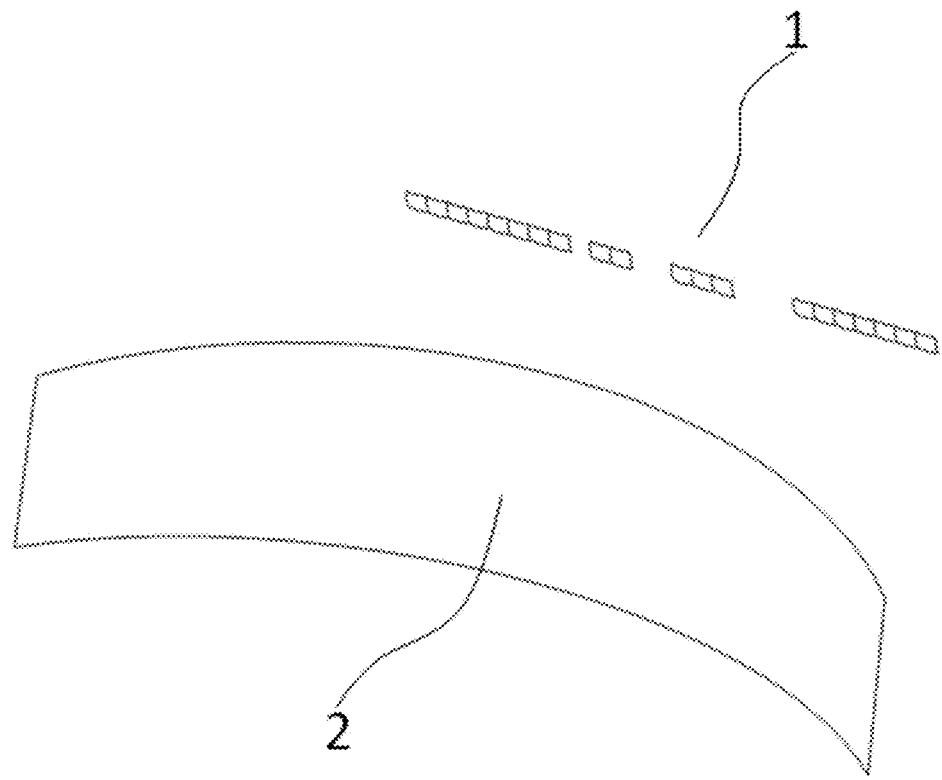
FIG. 3 is another structure diagram of the vehicle lamp III-zone illumination structure shown in FIG. 1.
Figure 4:
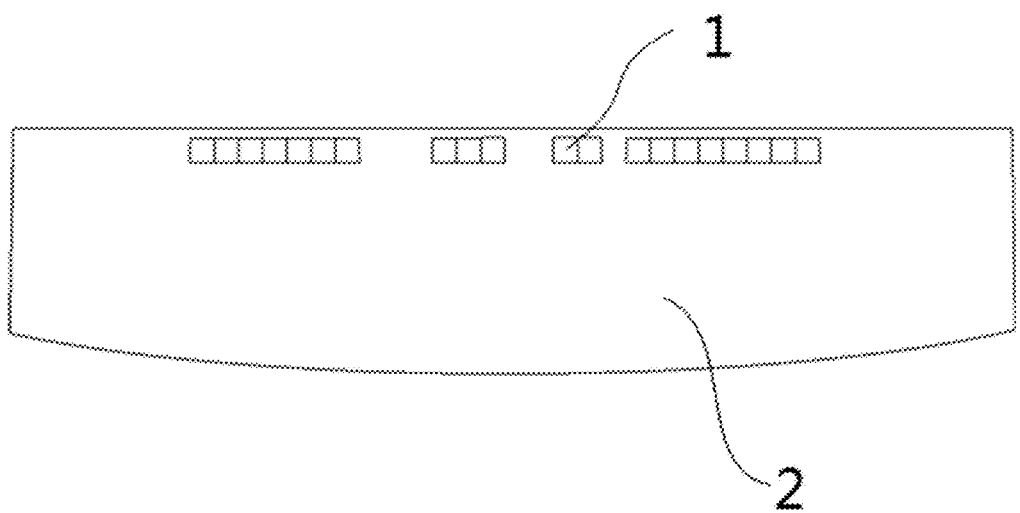
FIG. 4 is a front view of the vehicle lamp III-zone illumination structure shown in FIG. 1.
Figure 5:
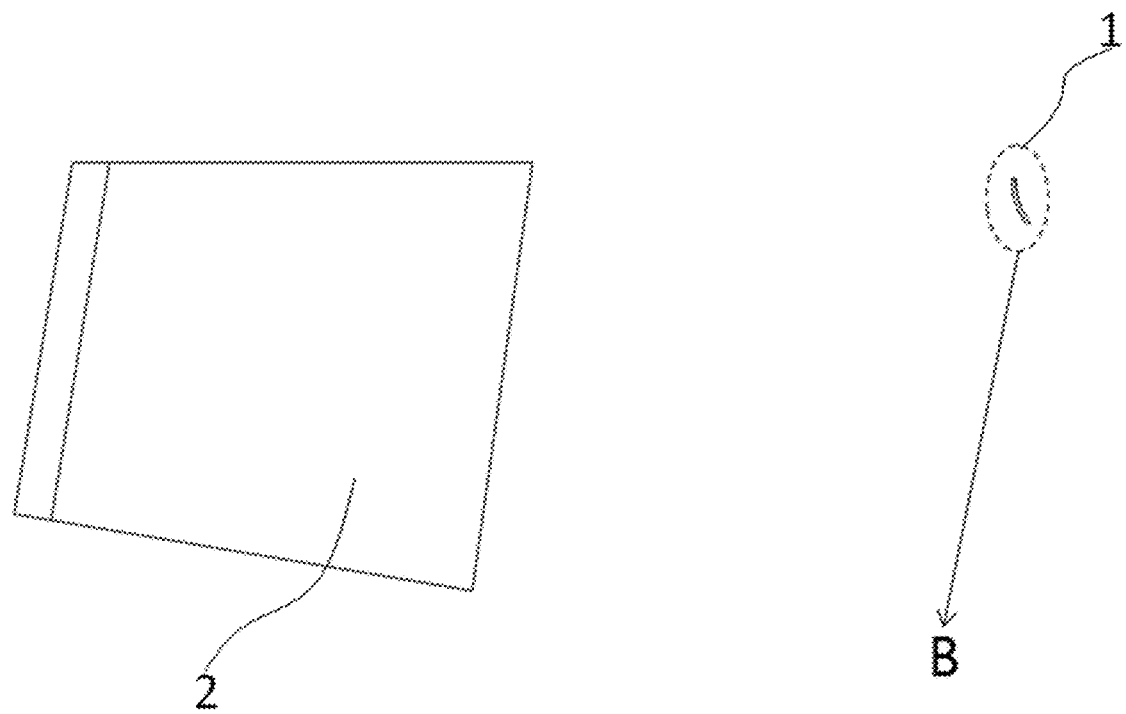
FIG. 5 is a side view of the vehicle lamp III-zone illumination structure shown in FIG. 1.
Figure 6:
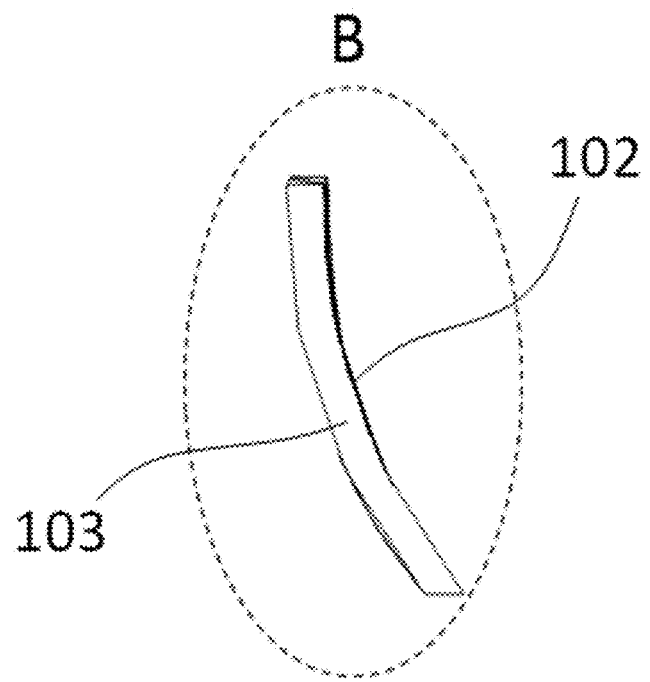
FIG. 6 is a partial enlargement view of a part B in FIG. 5.
Figure 7:
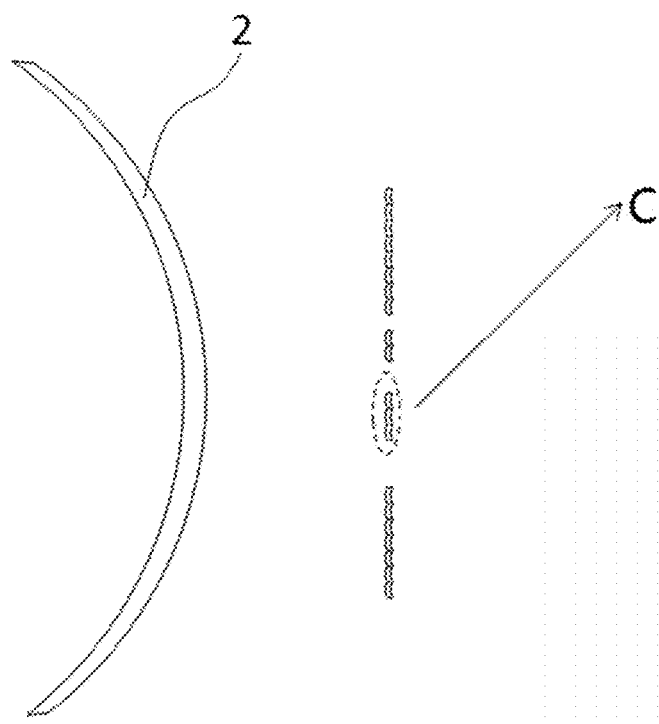
FIG. 7 is a top view of the vehicle lamp III-zone illumination structure shown in FIG. 1.
Figure 8:
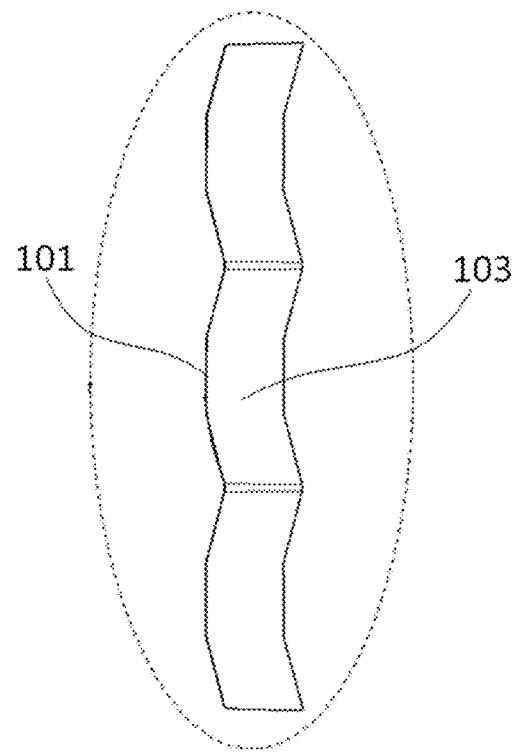
FIG. 8 is a partial enlargement view of a part C in FIG. 7.

| Description of Reference Numerals | |
|---|---|
| 1 III-zone light incident portion | 10 light transmission piece |
| 101 III-zone light incident surface | 102 III-zone horizontal extension profile |
| 103 III-zone vertical extension profile | 2 III-zone light emitting portion |
| 3 high beam incident portion | 4 oblique reflecting surface |
| 5 A condenser upper surface | 6 front-back optical channel |
| 7 50 L dark area forming structure | 8 cut-offline forming structure |
| 001 vehicle lamp condenser | 002 high beam circuit board |
| 003 reflecting mirror | 004 low beam circuit board |
| 005 lens | |

DETAILED DESCRIPTION OF THE EMBODIMENTS

Specific embodiments of the present disclosure will be described in details below in combination with accompanying drawings. It should be understood that the specific embodiments described herein are merely used for describing and interpreting the present disclosure, and the protection scope of the present disclosure is not restricted to the following specific embodiments.

In the description of the present disclosure, it should be interpreted that the orientation or position relationship indicated by terms such as "upper", "lower", "front" and "back" is the orientation or position relationship indicated based on the accompanying drawings, and just aims to facilitate description of the present disclosure and simplify the description, rather than to indicate or imply that devices or elements indicated must have a specific orientation, and must be configured and operated at a specific orientation, thus not being understood as restriction on the present disclosure.

In the description of the disclosure, it should be noted that unless otherwise prescribed and defined clearly, terms such as "connection" and "mounting" should be understood in a broad sense, for example, it can be a fixed connection and can also be a detachable connection or an integral connection, it can be a direct connection and can also be an indirect connection through an intermediary, and it can be communication of two elements inside or mutual acting relationship of two elements. Those of ordinary skill in the art can understand the specific meanings of the above terms in the present disclosure depending on specific situations. In the present disclosure, normal refers to a direction or a straight line perpendicular to a certain surface. A normal derection of III-zone light incident surfaces 101 is to indicate that the III-zone light incident surfaces 101 are arranged towards an III-zone light emitting portion 2. When the III-zone light incident surfaces 101 are of concave curved surfaces or convex curved surface structures, normal representing the III-zone light incident surfaces 101 is normal of center points of curved surfaces, and For a center point of a curved surface, which cannot be determined easily, a focus of the curved surface and a straight line formed by intersection of a vertical bisecting surface and a horizontal bisecting surface of the curved surface is the center point.

An vehicle lamp III-zone illumination structure provided by a first aspect of the present disclosure, as shown in FIGS. 1-8, comprises an III-zone light incident portion 1 and an III-zone light emitting portion 2 which are sequentially arranged along a light incidence direction, wherein the III-zone light incident portion 1 comprises at least two light transmission pieces 10 distributed in a horizontal direction, each of the light transmission piece 10 comprises III-zone light incident surface 101, the structure of the light transmission piece is suitable for forming light extension profile, and a normal direction of the III-zone light incident surface 101 is toward the III-zone light emitting portion 2. Light forming an III-zone is incident to the III-zone light incident surfaces 101, and after being diffused via the III-zone light incident surfaces, light is emitted to the III-zone light emitting portion 2 and is finally emitted via the III-zone light emitting portion 2.

It should be noted that a plurality of light transmission pieces 10 in the present disclosure can be arranged horizontally in a linear shape in a horizontal direction. In the case of substantially maintaining sequential arrangement in a horizontal direction, making the light transmission pieces 10 have a millimeter-level slight deviation in a vertical direction is a customary substitution for those skilled in the art and falls into the protection scope of the present disclosure. In addition, the light transmission piece 10 is suitable for forming light extension profile with concave structure and convex structure or other structure that have a same technical effect. The normal direction of the III-zone light incident surface 101 is toward the III-zone light emitting portion 2, indicating that the III-zone light incident surfaces 101 are arranged towards the III-zone light emitting portion 2. In this way, light entering the III-zone light incident surfaces 101 can be emitted to the III-zone light emitting portion 2 after being diffused.

Through the above basic technical solution of the present disclosure, when the vehicle lamp III-zone illumination structure is in use, the III-zone light incident portion 1 and the III-zone light emitting portion 2 are mounted on an vehicle lamp condenser, the III-zone light incident portion 1 and the III-zone light emitting portion 2 are sequentially arranged along the light incidence direction, so that light forming the III-zone is incident to the III-zone light incident surfaces 101, and after being diffused via the III-zone light incident surface 101, light is emitted to the III-zone light emitting portion 2 and finally emitted via the III-zone light emitting portion 2.

As an embodiment of the present disclosure, the light transmission piece 10 is of concave curved surface structure or convex curved surface structure, and the light extension profile comprises an III-zone horizontal extension profile 102 which is formed from by cross-sectional profile of the light transmission piece 10 in a horizontal direction and/or III-zone vertical extension profile 103 which is formed by cross-sectional profile of the light transmission piece in a vertical direction. Incident III-zone light is subjected to angular extension in the horizontal direction through the III-zone horizontal extension profiles 102, and is subjected to angular extension in the vertical direction through the III-zone vertical extension profiles 103, so as to satisfy requirements of an III-zone illumination scope. It should be noted that those skilled in the art can, according to requirements, set extension profiles in either the horizontal direction or the vertical direction, so that light corresponding to the III-zone extends in only one direction, which also falls within the protection scope of the present disclosure.

In the present disclosure, the III-zone horizontal extension profile 102 and/or the III-zone vertical extension profile 103 can be arranged as arcs. Preferably, the III-zone horizontal extension profile 102 and/or the III-zone vertical extension profile 103 are arcs having radiuses R being smaller than or equal to 5 mm, so that light of the III-zone can be subjected to effective angular extension in the horizontal and vertical directions, so as to adjust the illumination scope and illumination intensity of the III-zone. Specifically, the III-zone horizontal extension profile 102 and/or the III-zone vertical extension profile 103 can be arranged as arcs having radiuses R being equal to 2 mm.

As an embodiment of the present disclosure, the plurality of light transmission pieces 10 are sequentially arranged continuously or at intervals. In the present disclosure, distribution manners of the plurality of light transmission pieces 10 can be as follows: separated light incident areas having two light transmission pieces, three light transmission pieces, seven light transmission pieces or eight light transmission pieces respectively are formed, but are not limited to the distribution manners, and those skilled in the art can also arrange the light transmission pieces 10 in a close connection manner and other manners.

As an embodiment of the present disclosure, size of the III-zone light incident surface 101 in the horizontal direction and/or the vertical direction is 0.5-2 mm. The III-zone light incident surface 101 with small areas can further relieve influence on a high beam shape and avoid influence of a too big III-zone structure on the high beam shape. The III-zone light incident surface 101 with the size being 0.5-2 mm can achieve a corresponding technical purpose and a corresponding technical effect. If the size of the III-zone light incident surface 101 in the horizontal direction and/or the vertical direction is smaller than 0.5 mm, it is very difficult to obtain an appropriate III-zone illumination scope and implement a process as well; if the size is greater than 2 mm, influence caused on the high beam shape is more serious than influence caused on the high beam shape when the size is smaller than 2 mm. Specifically, the size of the III-zone light incident surface 101 in the horizontal direction and/or the vertical direction can be set to be 1 mm, thus not only satisfying a precision requirement of a manufacturing process and also relieving influence on the high beam shape. In the present disclosure, the area of each light transmission piece 10 is substantially equal, but it does not mean that the area of each light transmission piece 10 must be equal, and a technical solution that the areas can be set to be not equal in a case that the areas satisfy the above size parameters defined falls within the protection scope of the present disclosure.

As an embodiment of the present disclosure, the III-zone light emitting portion 2 is of a concave cambered surface structure with a continuous curvature, so as to perform further angular extension on emitted III-zone light. The reason for setting the continuous curvature is to prevent a discontinuous curvature from causing an uneven III-zone light shape and the like when the III-zone I light emitting portion 2 functions as a light emitting surface.

Figure 9:
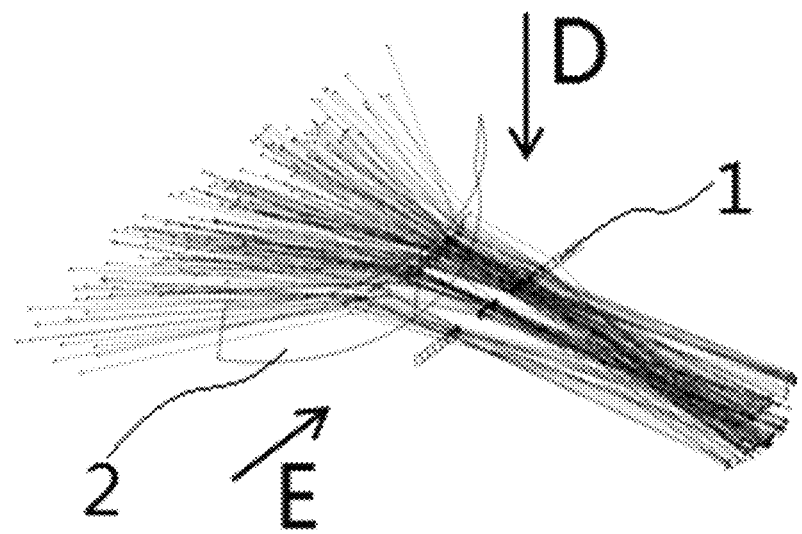
FIG. 9 is a schematic diagram of a light direction of the vehicle lamp III-zone illumination structure shown in FIG. 1.
Figure 10:
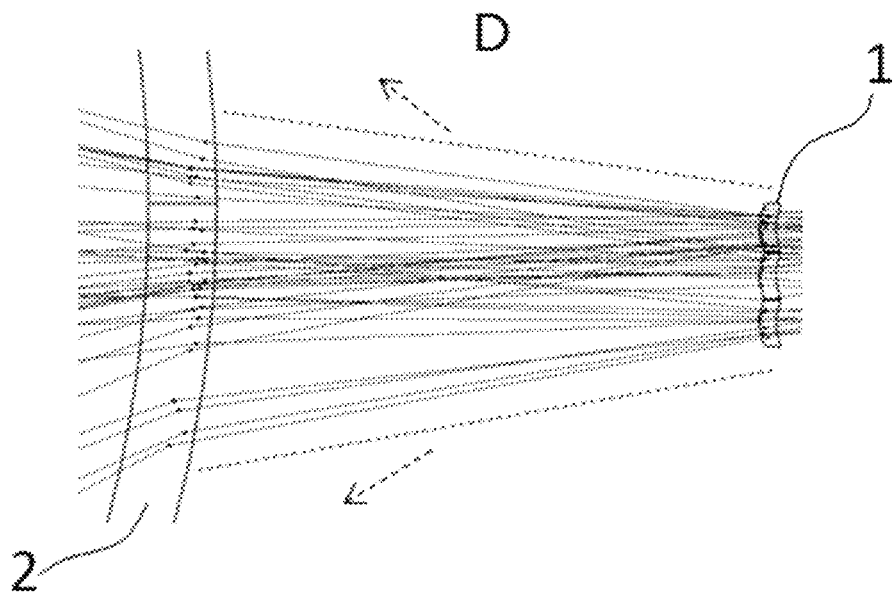
FIG. 10 is a schematic diagram of a light direction in a top view direction from a perspective D in FIG. 9.
Figure 11:
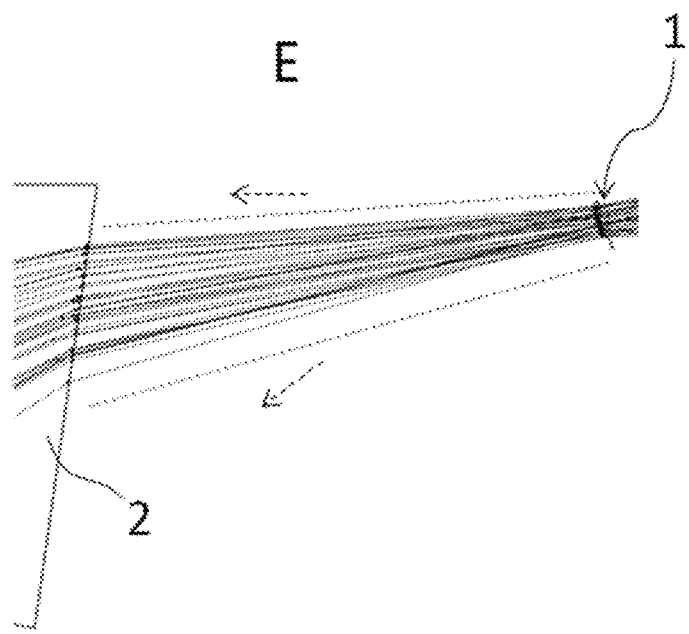
FIG. 11 is a schematic diagram of a light direction in a side view direction from a perspective E in FIG. 9.
Figure 12:
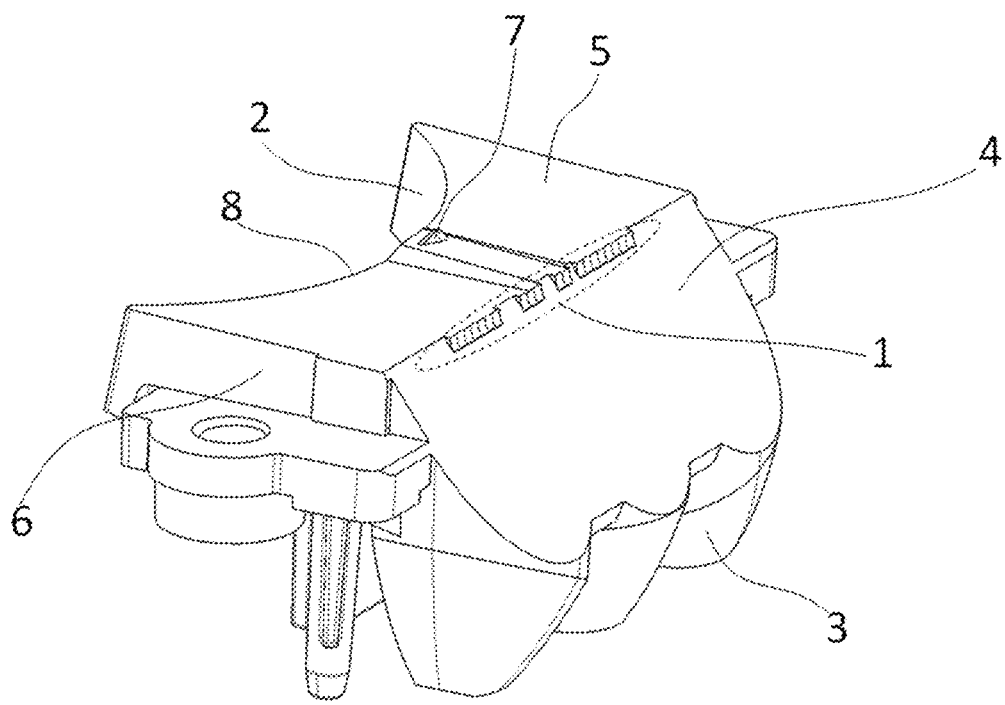
FIG. 12 is a perspective view of an embodiment of an vehicle lamp condenser in the present disclosure.
Figure 13:
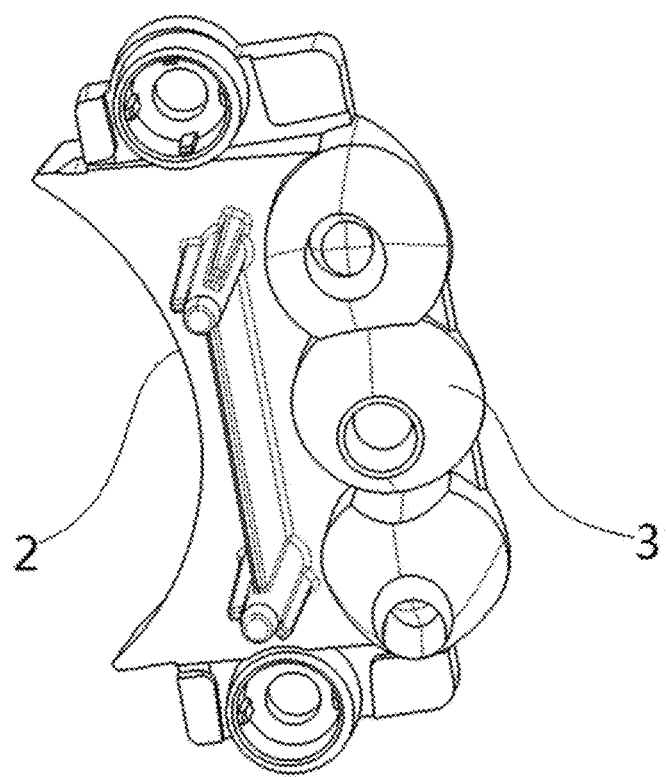
FIG. 13 is a bottom view of the vehicle lamp condenser shown in FIG. 12.
Figure 14:
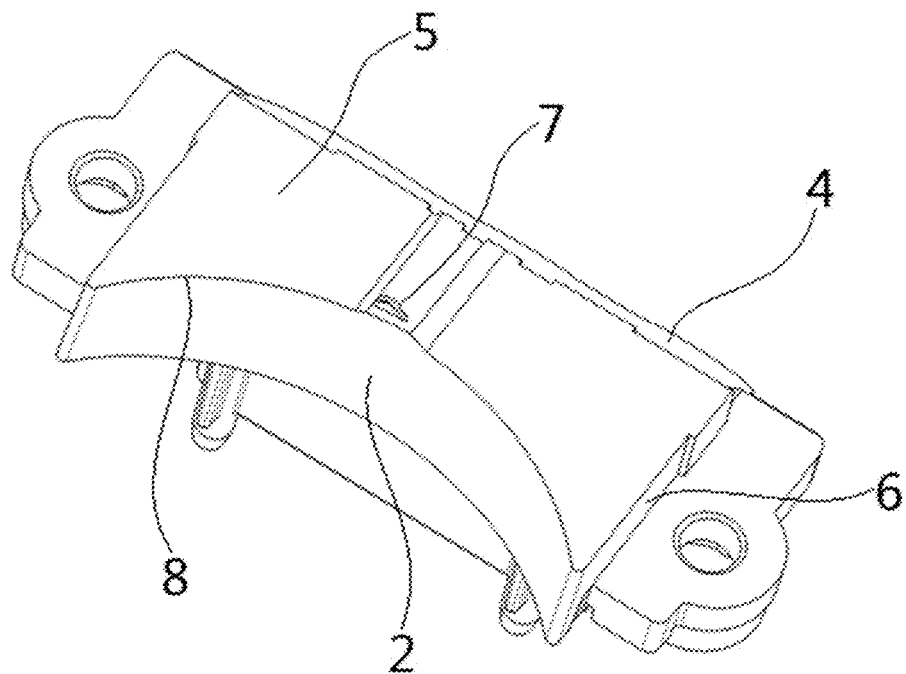
FIG. 14 is another structure diagram of the vehicle lamp condenser shown in FIG. 12.
Figure 15:
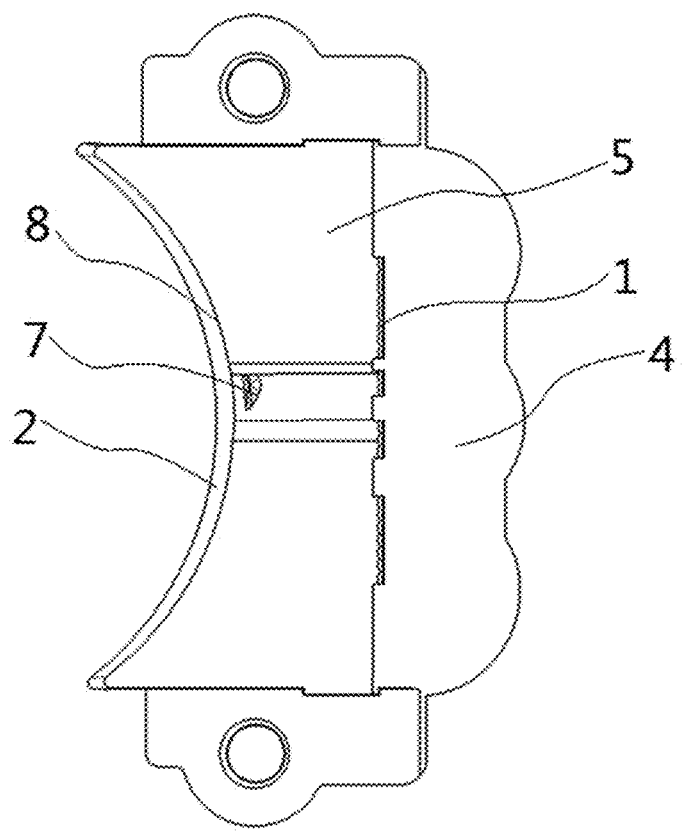
FIG. 15 is a bottom view of the vehicle lamp condenser shown in FIG. 12.

It can be seen from the above description that the vehicle lamp III-zone illumination structure of the present disclosure has the advantages as follows: by setting the III-zone light incident surfaces 101 as a plurality of light transmission pieces 10 that perform light extension in the horizontal and/or the vertical direction, light shapes corresponding to the plurality of light transmission pieces 10 with small areas are commonly spliced and overlapped to form the III-zone light shape, so that the III-zone light shape can be split more finely and can be adjusted more finely. A light direction of the III-zone light shape formed by using the vehicle lamp III-zone illumination structure is as shown in FIGS. 9-11. It can be known from a schematic diagram of a light direction in a top view direction from a perspective D that light passing through the III-zone forms an angular scope extending towards two horizontal sides in the horizontal direction. It can be known from a schematic diagram of a light direction in a side view direction from a perspective E that light of the III-zone forms an angular scope extending towards upper and lower sides, especially towards the lower side, in the vertical direction. It can be known from legal regulations of vehicle lamps such as GB25991 or ECE R112 that an III-zone of low beam is provided with a plurality of test positions such as P1, P2, P3, P4, P5, P6, P7, P8, B50 L and HV, and the III-zone illumination structure can be designed finely, so that the local adjustment capability of the III-zone is improved, thus making adjustment of the III-zone more controllable and finer.

Based on the above vehicle lamp III-zone illumination structure of the present disclosure, a second aspect of the present disclosure provides an vehicle lamp condenser, comprising a high beam incident portion 3, an oblique reflecting surface 4, a condenser upper surface 5 and a front-back optical channel 6; and further comprising the above vehicle lamp III-zone illumination structure.

Further, as shown in FIGS. 12-15, one end of the oblique reflecting surface 4 is connected to the high beam incident portion 3 and the other end of the oblique reflecting surface 4 is connected to the condenser upper surface 5; the III-zone light incident portion 1 is arranged at one side, in proximity to the condenser upper surface 5, of an upper surface of the oblique reflecting surface 4, and the III-zone light emitting portion 2 is arranged at an end part, away from the oblique reflecting surface 4, of one end of the condenser upper surface 5; and the front-back optical channel 6 is arranged between the III-zone light emitting portion 2 and the oblique reflecting surface 4. Light emitted from a high beam source, after being incident via the high beam incident portion 3, is emitted to the oblique reflecting surface 4. After being fully reflected, a part of light is directly emitted from the III-zone light emitting portion 2 via the front-back optical channel 6 and the other part of light is emitted to the condenser upper surface 5 and then emitted from the III-zone light emitting portion 2 after being fully reflected by the condenser upper surface 5. Light of the III-zone and light of high beam use the front-back optical channel 6 in common rather than to arrange a separate channel for light of the III-zone, so as to avoid excessive influence on a high beam shape.

As an embodiment of the present disclosure, the high beam incident portion 3 comprises at least one condensing cup-like structure, a concave cavity is formed at a center of the condensing cup-like structure, and a cross section of an outer profile gradually increases along a light emitting direction; and normal of a light incident surface of the high beam incident portion 3 is a vertical direction.

As an embodiment of the present disclosure, the vehicle lamp condenser further comprises a 50 L dark area forming structure 7 which is arranged in middle of at a front end of the condenser upper surface 5 and/or a cut-off line forming structure 8 which is arranged at an intersection of the condenser upper surface 5 and the III-zone light emitting portion 2. The vehicle lamp condenser, in addition to being used for formation of the III-zone light shape and the high beam shape, is further used for formation of a SOL dark area and a cut-off line in a low beam shape in an automobile illumination module integrated with high beam and low beam.

As an embodiment of the present disclosure, the high beam incident portion 3, the oblique reflecting surface 4, the condenser upper surface 5 and the front-back optical channel 6 are formed integrally to improve structural stability of the vehicle lamp condenser and avoid causing a deviation of the light shape caused by mounting and fixing between parts; and the vehicle lamp condenser is molded by transparent plastic, silicone or glass, specifically polycarbonate (PC) or polymethyl methacrylate (PMMA), and utilizes common properties of the materials in transparency and light permeability.

Figure 16:
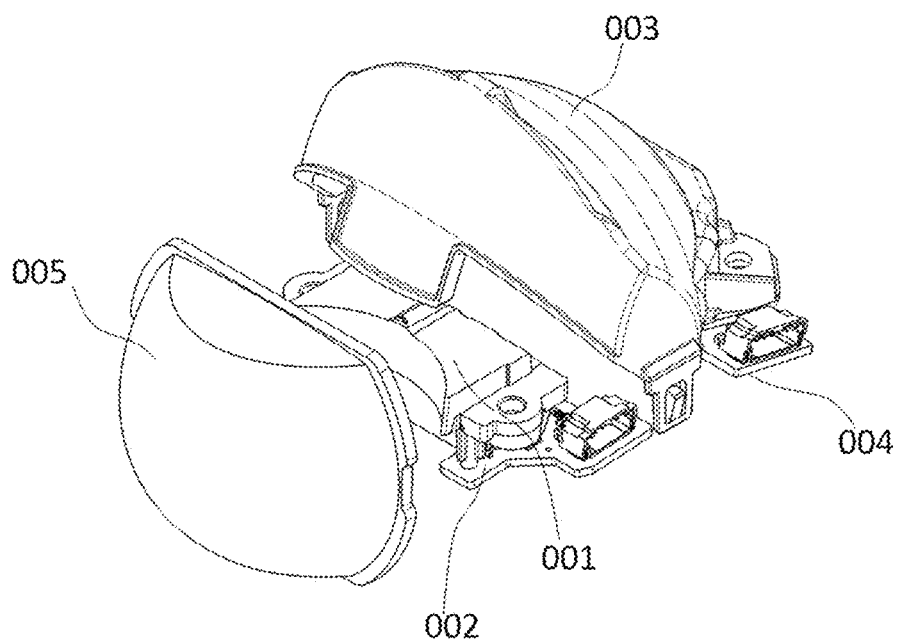
FIG. 16 is a perspective view of an embodiment of an automobile illumination module in the present disclosure.
Figure 17:
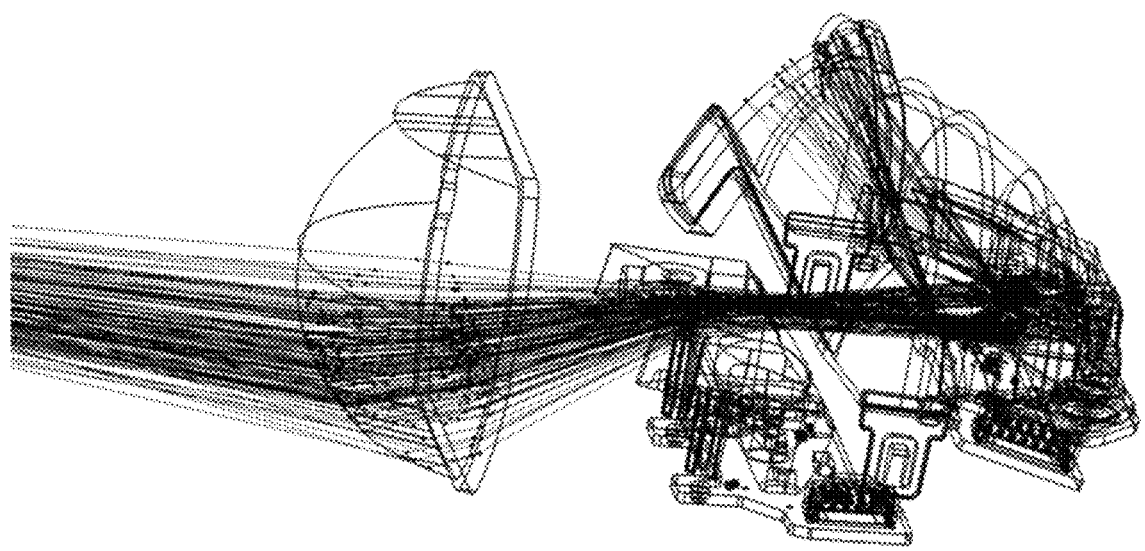
FIG. 17 is a schematic diagram of an III-zone light direction of an automobile illumination module in the present disclosure.

Based on the above vehicle lamp condenser of the present disclosure, a third aspect of the present disclosure provides an automobile illumination module, as shown in FIG. 16, comprising a high beam circuit board 002, a reflecting mirror 003, a low beam circuit board 004 and a lens 005 and further comprising the above vehicle lamp condenser 001. Those skilled in the art can determine clearly and uniquely that the illumination module is further provided with a radiator, a lens support and other parts, which are not described in details herein. The automobile illumination module is a device or a unit arranged in an automobile headlamp and playing roles of low beam and/or high beam illumination. As shown in FIG. 17, light emitted from a low beam source on the low beam circuit board 004 is reflected via the reflecting mirror 003 to be used as incident light of the III-zone light incident portion 1 on the condenser 001, light enters the lens 005 after being emitted from the III-zone light emitting portion 2 and then is emitted to the front by the lens 005, to form the III-zone light shape.

Based on the above automobile illumination module of the present disclosure, a fourth aspect of the present disclosure provides an automobile illumination apparatus, comprising the above automobile illumination module.

A fifth aspect of the present disclosure provides an automobile, comprising the above automobile illumination apparatus. Therefore, beneficial effects brought by a technical solution at least having the embodiments of the above vehicle lamp III-zone illumination structure are not described in details herein.

The preferred embodiments of the present disclosure are described above in combination with the accompanying drawings, however, the present disclosure is not limited to the preferred embodiments. Within the scope of the technical conception of the present disclosure, various simple variations, comprising combination of specific technical features in any appropriate manner, can be made to the technical solution of the present disclosure. In order to avoid unnecessary repetition, the present disclosure does not additionally describe various possible combination manners. However, the simple variations and combinations should be similarly deemed as contents disclosed in the present disclosure and fall within the protection scope of the present disclosure.

The invention claimed is:

1. A vehicle lamp condenser, comprising a high beam incident portion, an oblique reflecting surface, a condenser upper surface, and a front-back optical channel, and further comprising a vehicle lamp III-zone illumination structure, comprising an III-zone light incident portion and an III-zone light emitting portion which are sequentially arranged along a light incidence direction, wherein
   the III-zone light incident portion comprises at least two light transmission pieces distributed in a horizontal direction, each of the light transmission pieces comprises an III-zone light incident surface, and the structure of the light transmission piece is suitable for forming light extension profile, and a normal direction of the III-zone light incident surface is toward the III-zone light emitting portion; and
   light forming an III-zone is incident to the III-zone light incident surfaces, and after being diffused via the III-zone light incident surfaces, light is emitted to the III-zone light emitting portion and finally emitted via the III-zone light emitting portion.

2. The vehicle lamp condenser according to claim 1, wherein the light transmission piece is of concave curved surface structure or convex curved surface structure, and the light extension profile comprises an III-zone horizontal extension profile which is formed by cross-sectional profile of the light transmission piece in a horizontal direction and/or an III-zone vertical extension profile which is formed by cross-sectional profile of the light transmission piece in a vertical direction.

3. The vehicle lamp condenser according to claim 2, wherein the III-zone horizontal extension profile and/or the III-zone vertical extension profile is a arc having radius R being smaller than or equal to 5 mm.

4. The vehicle lamp condenser according to claim 1, wherein a plurality of light transmission pieces are sequentially arranged continuously or at intervals.

5. The vehicle lamp condenser according to claim 1, wherein size of the III-zone light incident surface in the horizontal and/or the vertical direction is 0.5-2 mm.

6. The vehicle lamp condenser according to claim 1, wherein the III-zone light emitting portion is of a concave cambered surface structure with a continuous curvature.

7. The vehicle lamp condenser according to claim 1, wherein one end of the oblique reflecting surface is connected to the high beam incident portion and the other end of the oblique reflecting surface is connected to the condenser upper surface; the III-zone light incident portion is arranged at one side, in proximity to the condenser upper surface, of an upper surface of the oblique reflecting surface, and the III-zone light emitting portion is arranged at an end part, away from the oblique reflecting surface, of one end of the condenser upper surface; and the front-back optical channel is arranged between the III-zone light emitting portion and the oblique reflecting surface.

8. The vehicle lamp condenser according to claim 1, wherein the high beam incident portion comprises at least one condensing cup-like structure, a concave cavity is formed at a center of the condensing cup-like structure, a cross section of an outer profile of the condensing cup-like structure gradually increases along a light emitting direction, and a normal direction of a light incident surface of the high beam incident portion is a vertical direction.

9. The vehicle lamp condenser according to claim 1, wherein the vehicle lamp condenser further comprises a 50 L dark area forming structure which is arranged in middle of a front end of the condenser upper surface and/or a cut-off line forming structure which is arranged at an intersection of the condenser upper surface and the III-zone light emitting portion.

10. The vehicle lamp condenser according to claim 1, wherein the high beam incident portion, the oblique reflecting surface, the condenser upper surface and the front-back optical channel are formed integrally, and the vehicle lamp condenser is molded by transparent plastic, silicone or glass.

11. An automobile illumination module, comprising a high beam circuit board, a reflecting mirror, a low beam circuit board and a lens, and further comprising the vehicle lamp condenser according to claim 1.

12. The vehicle lamp condenser according to claim 1, wherein the light transmission piece is of concave curved surface structure or convex curved surface structure, and the light extension profile comprises an III-zone horizontal extension profile which is formed by cross-sectional profile of the light transmission piece in a horizontal direction and/or an III-zone vertical extension profile which is formed by cross-sectional profile of the light transmission piece in a vertical direction.

13. The vehicle lamp condenser according to claim 1, wherein a plurality of light transmission pieces are sequentially arranged continuously or at intervals.

14. The vehicle lamp condenser according to claim 1, wherein the III-zone light emitting portion is of a concave cambered surface structure with a continuous curvature.

15. The automobile illumination module according to claim 12, wherein one end of the oblique reflecting surface is connected to the high beam incident portion and the other end of the oblique reflecting surface is connected to the condenser upper surface; the III-zone light incident portion is arranged at one side, in proximity to the condenser upper surface, of an upper surface of the oblique reflecting surface, and the III-zone light emitting portion is arranged at an end part, away from the oblique reflecting surface, of one end of the condenser upper surface; and the front-back optical channel is arranged between the III-zone light emitting portion and the oblique reflecting surface.

16. The automobile illumination module according to claim 11, wherein the high beam incident portion comprises at least one condensing cup-like structure, a concave cavity is formed at a center of the condensing cup-like structure, a cross section of an outer profile of the condensing cup-like structure gradually increases along a light emitting direction, and a normal direction of a light incident surface of the high beam incident portion is a vertical direction.

17. The automobile illumination module according to claim 12, wherein the vehicle lamp condenser further comprises a 50 L dark area forming structure which is arranged in middle of a front end of the condenser upper surface and/or a cut-off line forming structure which is arranged at an intersection of the condenser upper surface and the III-zone light emitting portion.

18. The automobile illumination module according to claim 11, wherein the light transmission piece is of concave curved surface structure or convex curved surface structure, and the light extension profile comprises an III-zone horizontal extension profile which is formed by cross-sectional profile of the light transmission piece in a horizontal direction and/or an III-zone vertical extension profile which is formed by cross-sectional profile of the light transmission piece in a vertical direction.

19. The automobile illumination module according to claim 11, wherein a plurality of light transmission pieces are sequentially arranged continuously or at intervals.

* * * * *